United States Patent [19]

Kobayashi et al.

[11] Patent Number: 4,926,499
[45] Date of Patent: May 15, 1990

[54] CARRIER PHASE CONTROLLER FOR A RECEIVER OF PHASE MODULATED SIGNALS

[75] Inventors: Naoya Kobayashi, Musashino; Makoto Ohnishi, Tokyo; Yoshiro Kokuryo, Tachikawa, all of Japan

[73] Assignee: Hitachi, Ltd., Tokyo, Japan

[21] Appl. No.: 122,318

[22] Filed: Nov. 18, 1987

[30] Foreign Application Priority Data

Nov. 19, 1986 [JP] Japan ................... 61-274082

[51] Int. Cl.$^5$ .............................................. H04B 1/10
[52] U.S. Cl. ........................ 455/306; 455/302; 455/317; 455/309; 375/118
[58] Field of Search ............ 455/306, 302, 304, 305, 455/308, 309, 312, 317; 375/99, 8, 118

[56] References Cited

U.S. PATENT DOCUMENTS 4,696,055 9/1987 Marshall .................... 455/306 X
4,718,113 1/1988 Rother et al. ................ 455/302 X

FOREIGN PATENT DOCUMENTS 53-54955 5/1978 Japan .

Primary Examiner—Robert L. Griffin
Assistant Examiner—Ralph Smith
Attorney, Agent, or Firm—Pennie & Edmonds

[57] ABSTRACT

A simplified carrier phase control apparatus used in a modem for demodulating a quadrature amplitude modulated data signal, to correct phase jitters of a carrier signal due to a 50 Hz or a 60 Hz frequency of the commercial power supply, and its harmonic wave frequency components. The carrier phase control apparatus has a predictive filter for predicting a carrier phase jitter, the predictive filter composed of band-pass filters with center frequencies of 50 Hz and 60 Hz, and a circuit where the output signals of the band-pass filters are multiplied by the coefficients and added linearly.

5 Claims, 2 Drawing Sheets

CARRIER PHASE CONTROLLER FOR A RECEIVER OF PHASE MODULATED SIGNALS

BACKGROUND OF THE INVENTION

1. Field of the Invention

This invention is related to a carrier phase control apparatus used in a receiver apparatus (MODEM) adapted to demodulate a data signal modulated with a carrier signal through, for example, quadrature amplitude modulation and more particularly to an apparatus adapted to correct a carrier signal for a phase jitter having a 50 Hz (or 60 Hz) wave component, presumably leaking from the commercial power supply, and its harmonic wave components.

2. Description of the Prior Art

In order to reproduce data from a received data signal subject to phase modulation such as quadrature amplitude modulation, a carrier signal identical to a carrier with which the received data signal is modulated must be regenerated and many apparatuses for carrier recovery have been known.

A significant problem encountered in the carrier recovery is that a transmitted carrier signal suffers from a phase jitter due to a 50 Hz (or 60 Hz) wave component presumably leaking from the commercial power supply and its harmonic wave components.

An apparatus for eliminating a phase jitter has been known as disclosed in JP-A-53-54955, wherein a phase-modulated received signal is demodulated into a base band signal which in turn is equalized by an automatic equalizer, and a predictive filter predicts a carrier phase jitter on the basis of the equalized signal, to produce an output signal which is used to eliminate the carrier phase jitter. However, in the known apparatus, a two-dimensional automatic equalizer of transversed type is used as the predictive filter. Therefore, for the sake of suppressing the carrier phase jitter accurately and sufficiently, the necessary number of taps of the transversal filter is for example, about 30 or more. Accordingly, an arrangement to this end becomes complicated and can hardly be adapted for high-speed processings.

SUMMARY OF THE INVENTION

A principal object of this invention is to realize a carrier phase control apparatus, used in a modem for a received data signal subject to phase modulation such as quadrature amplitude modulation, which can sufficiently suppress the carrier phase jitter caused by the 50 Hz or 60 Hz signal component from the commercial power supply and its harmonic wave components.

Especially, the present invention is aimed to realize a predictive filter for predicting the carrier phase jitter with a relatively simplified hardware.

According to the invention, to accomplish the above objects a predictive filter, used in the carrier phase control apparatus to provide a predicted value of a phase jitter, comprises some band-pass filters for passing signals at a frequency band covering the commercial power supply frequency and its harmonic wave frequency components, and band-pass filters outputs are added linearly to provide a predicted phase jitter.

The predicted value of a phase jitter is given by linear addition. Therefore, the prediction error is reduced to the minimum value. The phase jitter can be suppressed adaptively over the entire frequency range covering 50 to 60 Hz frequencies and 100 to 120 Hz frequencies.

The carrier phase control apparatus based on the present invention can suppress the phase jitter with no more than four band-pass filters, and its hardware is more simplified than the conventional apparatus.

The abovementioned features and other objects of this invention will be more apparent by referring to the following description with the accompanying drawings.

DESCRIPTION OF THE PREFERRED EMBODIMENTS

Figure 1:
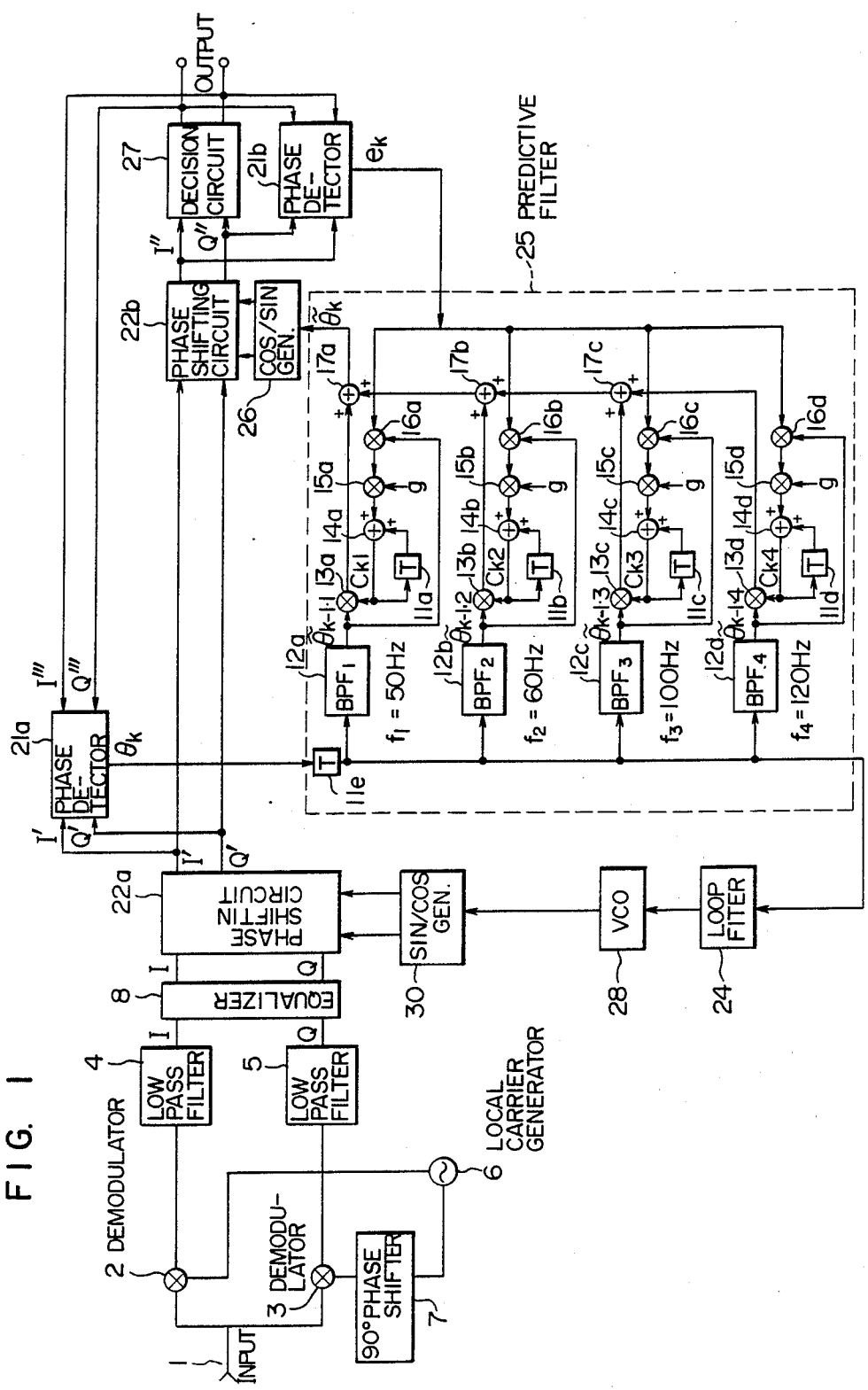
FIG. 1 is a circuit diagram showing a carrier phase control apparatus according to an embodiment of the invention.

Referring to FIG. 1, the overall structure of a carrier phase control apparatus according to the invention is illustrated in block diagram.

In FIG. 1, a received quadrature amplitude modulated signal reaches to demodulator 2 and 3, followed by low-pass filters 4 and 5, respectively. The demodulator 2 generates an in phase signal from a local carrier generator 6 and the demodulator 3 generates a quadrature signal whose phase is 90° shifted by phase shifting circuit 7. The outputs of low-pass filters 4 and 5 are a demodulated signal I which is in phase with the local carrier and a demodulated signal Q which is 90° shifted relative to the local carrier. These signals I and Q, containing degradation factors such as carrier frequency offset and phase jitter, are supplied to a phase shifting circuit 22a after automatic equalization by an automatic equalizer 8.

The phase shifting circuit 22a operates to mitigate the effect of the carrier frequency offset.

A phase detector 21a detects the phase difference between the phase shifter output signals I', Q' and the output signals I''', Q''' from a decision circuit 27 which determines the signal point on the constellation from where I''' and Q''' are transmitted. A resulting phase difference is represented by $\theta_k$.

A predictive filter 25 is based on the principle to be described later, and provides a predicted value $\hat{\theta}_k$ which is an estimated value of $\theta_k$. A cos/sin generating circuit 26 receives the predicted value $\hat{\theta}_k$, and generates the signals cos $\hat{\theta}_k$ and sin $\hat{\theta}_k$.

A phase shifting circuit 22b rotates the phase of I' and Q' by $\hat{\theta}_k$ using cos $\hat{\theta}_k$ and sin $\hat{\theta}_k$ of a cos/sin generating circuit 26.

A decision circuit 27 operates as a hard decision circuit as mentioned before thus producing the output signals I''' and Q'''. A phase detector 21b compares the phase between signals I'', Q'' and the signals I''' and Q''' to finally detect the residual phase jitter. This amount is represented by a prediction error $l_k$. By using the error signal $l_k$, the predictive filter 25 updates tap coefficients $C_{k1}, C_{k2} \ldots$ The output signal of the phase detector 21a is also fed to a loop filter 24. The output signal of the loop filter 24 is an estimated value of the carrier offset frequency, and is transmitted through voltage-controlled oscillator 28 and sin/cos generator 30 to the phase shifting circuit 22a, which in turn eliminates the carrier frequency offset.

By repeating the above mentioned operation, the carrier phase can be controlled adaptively.

The construction and operation of the predictive filter, the essential part of the invention, will now be described in greater details.

As shown in FIG. 1, the predictive filter 25 comprises one-symbol delay elements 11a to 11e, band-pass filters 12a to 12d, multipliers 13a to 13d, 15a to 15d, and 16a to 16d, and adders 14a to 14d and 17a to 17c.

In this embodiment, assuming that carrier phase jitters are due to frequencies f1=50 Hz, f2=60 Hz, f3=100 Hz and f4=120 Hz, predicted values of these carrier phase jitters will be obtained.

On the assumption that a carrier phase jitter is coherent, it is indicated by $$\theta_k = A \cos \omega kT \ldots \quad (1)$$

where k represents a symbol time sampled at a band rate, A is phase a jitter amplitude, $\omega$ is jitter angular frequency, and T is one-symbol delay time.

When the carrier phase jitter $\theta_k$ is fed to the delay element 11e at time (k), a preceding carrier phase jitter $\theta_{k-1}$ that was retained in the delay element 11e passes through each of the band-pass filters 12a to 12d.

In the following, to simplify the discussion, only 50 Hz and 60 Hz frequencies will be used.

Figure 2:
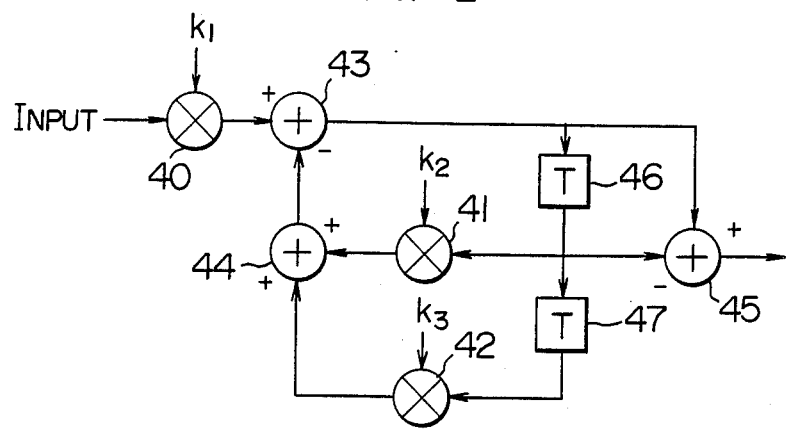
FIG. 2 is a band-pass filter constructed with a digital filter, which is used in FIG. 1.

The band-pass filters 12a and 12b have center frequencies 50 Hz and 60 Hz, respectively, and a Q value is 8 to 10. Each band-pass filter is realized, as shown in FIG. 2, with a conventionally wellknown recursive type digital filter, which is made of multipliers 40, 41, and 42, which multiply coefficients $k_1$, $k_2$ and $k_3$ to the inputs respectively adders 43, 44, and 45, and delay elements 46 and 47. Output signals of the band pass filters 12a and 12b are respectively indicated as follows:

$$\begin{aligned} \bar{\theta}_{k-1,1} &= r_1 A \cos (\omega kT + \phi_1 - \omega T) \\ \bar{\theta}_{k-1,1} &= r_2 A \cos (\omega kT + \phi_2 - \omega T) \end{aligned} \quad (2)$$

where $r_1$ and $r_2$ represent amplitude components, and $\phi_1$ and $\phi_2$ represent phase rotations which are determined by the jitter angular frequency. $r_1$, $r_2$, $\phi_1$ and $\phi_2$ are determined by the characteristics of the band-pass filters 12a and 12b. The output signals $\bar{\theta}_{k-1,1}$ and $\bar{\theta}_{k-1,2}$ are multiplied by tap coefficients $C_{k1}$ and $C_{k2}$ at the multipliers 13a and 13b, where the predicted value $\hat{\theta}_k$ of the carrier phase jitter is calculated as $$\hat{\theta}_k = C_{k1}\bar{\theta}_{k-1,1} + C_{k2}\bar{\theta}_{k-1,2} \ldots \quad (3)$$

wherein the tap coefficients $C_{k1}$ and $C_{k2}$ are sequentially updated with the prediction error $e_k = \theta_k - \hat{\theta}_k$, so that the mean squared errors of $<l_k^2>$ are minimized.

On the other hand, $l_{k-1}$ is correlated with $\bar{\theta}_{k-2,1}$ and $\bar{\theta}_{k-2,2}$, and coefficients $C_{k1}$ and $C_{k2}$ are updated as follows.

$$\begin{aligned} C_{k+1,1} &= C_{k1} + g_1 \bar{\theta}_{k-2,1} e_{k-1} \\ C_{k+1,2} &= C_{k2} + g_2 \bar{\theta}_{k-2,2} e_{k-2} \end{aligned} \quad (4)$$

where $g_1$ and $g_2$ are loop gains. These operations are repeated to predict the value of carrier phase jitter adaptively.

As is clear from the equations (1) to (3) the predictive filter of carrier phase control apparatus uses the output signals $\bar{\theta}_{k-1,1}$ and $\bar{\theta}_{k-1,2}$ of the band-pass filters 12a and 12b, and add them linearly to calculate the estimated value $\hat{\theta}_k$. Therefore, the phase jitter covering the entire frequency range can be eliminated in principle. If phase jitter is coherent, the prediction error can converge to zero. If the phase jitter contains a coherent signal component, the means squared prediction error is minimized, and that, optimum prediction is possible.

What has just been discussed is the case of using 2 band-pass filters. Likewise, four band-pass filters using band-pass filters 12c and 12d with center frequencies 100 Hz and 120 Hz, in addition to band-pass filters 12a and 12b, can be used when the harmonic wave components of the 50 Hz and 60 Hz jitters are taken into account.

As described above, in the carrier phase control apparatus of the present embodiment, the predictive filter is composed only of no more than 4 band-pass filters. Therefore, the hardware implementation is simplified compared with that of the conventional transversal filter.

Figure 3:
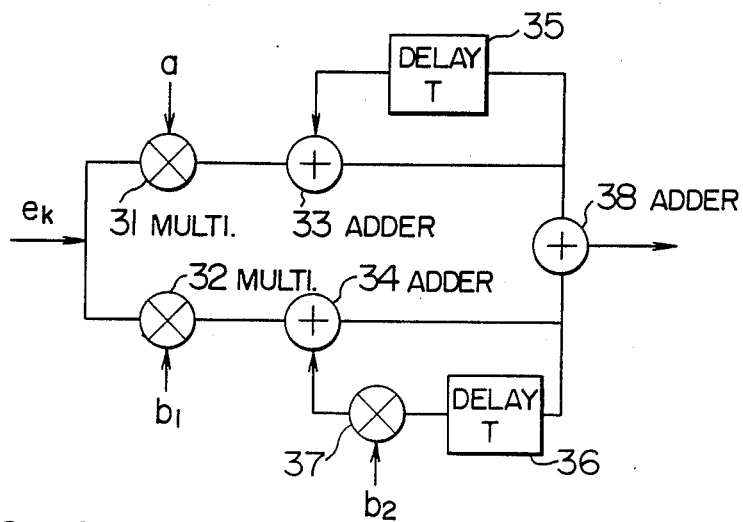
FIG. 3 is a circuit diagram showing an embodiment of a loop filter (24) in FIG. 1.

FIG. 3 shows an embodiment of the loop filter 24. This loop filter eliminates the effect of noises over a predetermined frequency range, thus improving the performance of a carrier phase control.

The output signal $l_k$ of phase detector 21a shown in FIG. 1 is fed to multipliers 31 and 32. The error signal is multiplied by the coefficient a at the multiplier 31, added at an adder 33 to the output signal of one symbol delay element 35, whose added result is fed to the delay element 35 and an adder 38.

A transfer function $H_1(z)$ between the input of multiplier 31 and the output of adder 38 is expressed by $$H_1(z) = \frac{a}{1 - Z^{-1}} \quad (5)$$

Figure 4:
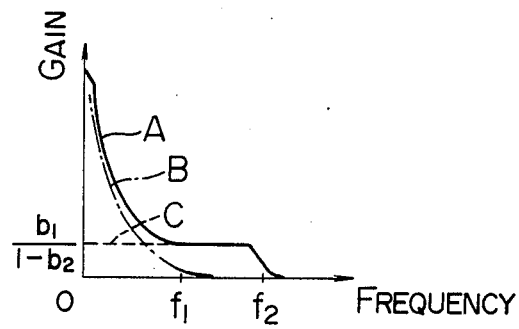
FIG. 4 represents frequency spectra of a loop filter shown in FIG. 3.

Equation (5) shows the frequency characteristics as shown by a chained curve B in FIG. 4.

The error signal is also multiplied by the coefficient $b_1$ at a multiplier 32, added at an adder 34 to the output signal of the multiplier 37, which is a multiplied result of the coefficient $b_2$ and the signal of a delay element 36. Then it is fed to a delay element 36 and the adder 38. A transfer function $H_2(z)$ between the multipliers 32 and the adder 38 is expressed by $$H_2(z) = \frac{b_1}{1 - b_2 Z^{-1}} \quad (6)$$

By selecting the value of the coefficient $b_2$ ($0 < b_2 < 1$), a low-pass filter is obtained whose gain is $H_2(o) = b_1 T/(1-b_2)$. This shows the frequency characteristics which is shown by a dotted curve C in FIG. 4.

The output signal of the adder 38 is the sum of the output signals of adders 33 and 34. Therefore, the loop filter 24 has a transfer function, that is $$H(z) = H_0(z) + H_2(z) \ldots \quad (7)$$

Equation (7) shows the frequency characteristics drawn by a solid curve A in FIG. 4, which is an added result from of the curves B and C.

As we see from FIG. 4, in the carrier phase/frequency controler, the gain over the frequency range exceeding a predetermined frequency $f_2$ (about 200 Hz) becomes zero without decreasing the gain over the frequency range below a predetermined frequency $f_1$. Here, $f_2$ is a frequency determined by the allowable amount of SNR degradation in the modem, and $f_1$ is a frequency determined by the natural frequency or the cut-off frequency of a loop filter 24.

Although this apparatus is constructed with digital circuits, it can obviously be implemented with analog circuits.

We claim:

1. A carrier phase control apparatus used in a modem demodulating a quadrature amplitude modulated data signal comprising:
   - a first phase shift means for shifting phase of output signals from an equalizer for correcting these signals for carrier frequency offset;
   - a second phase shift means for shifting phases of output signals from said first phase shift means;
   - a decision circuit for determining phase and amplitude of the output signal of said second phase shift means;
   - a first phase detector for detecting a phase error depending on a phase jitter by using output signals of said first phase shifting means and said decision circuit;
   - a second phase detector for detecting an error signal between the output signals of said second phase shifting means and said decision circuit;
   - a predictive filter for predicting a carrier phase jitter using the output signals of said first phase detector and said second phase detector;
   - a sinusoidal generator for producing sin and cos signals from the output signal of said predictive filter and for applying said cos and sin signals to said second phase shifting circuit; and
   - a control circuit for controlling said first phase shifting circuit by using output signal of a loop filter receiving an output signal of said first phase detector.

2. A carrier phase control apparatus according to claim 1, wherein the said predictive filter comprises a plurality of circuits each of which includes band-pass filters having a center frequency equal to a frequency of the commercial power supply, and its harmonic wave component frequency, a multiplier for multiplying an output signal of said band-pass filters by the coefficients, and a means for updating said coefficient with an output signal of said second phase detector.

3. A carrier phase control apparatus according to claim 2, wherein said plurality of band-pass filters have the center frequencies which are 50 Hz and 60 Hz.

4. A carrier phase control apparatus according to claim 1, wherein said loop filter has the gain which is zero over the frequency range more than a first frequency, said first frequency being determined depending on noise power to be eliminated.

5. A carrier phase control apparatus according to claim 4, wherein said first frequency is about 200 Hz.

* * * * *

UNITED STATES PATENT AND TRADEMARK OFFICE
CERTIFICATE OF CORRECTION

PATENT NO. : 4,926,499

DATED : May 15, 1990

INVENTOR(S) : KOBAYASHI et al.

It is certified that error appears in the above-identified patent and that said Letters Patent is hereby corrected as shown below:

On title page,

[73] Assignee: Change "Hitachi, Ltd., Tokyo, Japan" to --Hitachi, Ltd. and Hitachi Denshi Kabushiki Kaisha, Tokyo, Japan--.

Signed and Sealed this

Sixteenth Day of November, 1993

Attest:

BRUCE LEHMAN

*Attesting Officer*     *Commissioner of Patents and Trademarks*